United States Patent
Goebuchi

(10) Patent No.: US 9,735,884 B2
(45) Date of Patent: Aug. 15, 2017

(54) OPTICAL TRANSMITTER AND BIAS VOLTAGE CONTROL METHOD

(71) Applicant: NEC Corporation, Tokyo (JP)

(72) Inventor: Yuta Goebuchi, Tokyo (JP)

(73) Assignee: NEC Corporation, Tokyo (JP)

(*) Notice: Subject to any disclaimer, the term of this patent is extended or adjusted under 35 U.S.C. 154(b) by 233 days.

(21) Appl. No.: 14/422,232

(22) PCT Filed: Aug. 21, 2013

(86) PCT No.: PCT/JP2013/004929
§ 371 (c)(1),
(2) Date: Feb. 18, 2015

(87) PCT Pub. No.: WO2014/034047
PCT Pub. Date: Mar. 6, 2014

(65) Prior Publication Data
US 2015/0222365 A1    Aug. 6, 2015

(30) Foreign Application Priority Data
Aug. 28, 2012    (JP) .................................. 2012-187758

(51) Int. Cl.
*H04B 10/564*    (2013.01)
*H04B 10/556*    (2013.01)
(Continued)

(52) U.S. Cl.
CPC ......... *H04B 10/564* (2013.01); *G02F 1/0123* (2013.01); *H04B 10/5053* (2013.01); *H04B 10/50575* (2013.01); *H04B 10/5561* (2013.01)

(58) Field of Classification Search
CPC ........................ H04B 10/50575; G02F 1/0123
See application file for complete search history.

(56) References Cited

U.S. PATENT DOCUMENTS

2008/0187324 A1* 8/2008 Akiyama ............... H04B 10/50
398/188

FOREIGN PATENT DOCUMENTS

CN    1618152 A    5/2005
JP    2004-287330    10/2004
(Continued)

OTHER PUBLICATIONS

Office Action mailed Apr. 5, 2016, by the Chinese Patent Office in counterpart Chinese Patent Application No. 201380045760.8.
(Continued)

*Primary Examiner* — Shi K Li
*Assistant Examiner* — Mina Shalaby
(74) *Attorney, Agent, or Firm* — Finnegan, Henderson, Farabow, Garrett & Dunner, L.L.P.

(57) ABSTRACT

An optical transmitter includes: optical modulation means; bias voltage output means for supplying the optical modulation means with a bias voltage on which a pilot signal is superimposed; pilot signal receiving means; and bias voltage control means. The bias voltage control means includes: training means for determining a control start voltage and a control direction of the bias voltage based on a pilot signal component at first and second bias voltage values; and feedback means for determining an appropriate bias voltage to compensate for a deviation of an operating point of the optical modulation means by analyzing the pilot signal component while adjusting the bias voltage in a stepwise fashion along the control direction from the control start voltage after the control start voltage and the control direction are determined.

7 Claims, 16 Drawing Sheets

(51) Int. Cl.
H04B 10/50 (2013.01)
G02F 1/01 (2006.01)

(56) References Cited

FOREIGN PATENT DOCUMENTS

| | | |
|---|---|---|
| JP | 2005-005767 | 1/2005 |
| JP | 2006-314003 | 11/2006 |
| JP | 2007-310288 | 11/2007 |
| JP | 2008-092172 | 4/2008 |
| JP | 2008-197639 | 8/2008 |
| JP | 2011-160257 | 8/2011 |
| JP | 2011-197638 | 10/2011 |
| JP | 2012-227729 | 11/2012 |
| JP | 2013-54212 | 3/2013 |

OTHER PUBLICATIONS

Decision to Grant a Patent mailed Jan. 12, 2016, by the Japanese Patent Office in counterpart Japanese Patent Application No. 2014-532769.
International Search Report mailed Oct. 22, 2013 in corresponding PCT International Application.

* cited by examiner

EXAMPLE 3

EXAMPLE 4

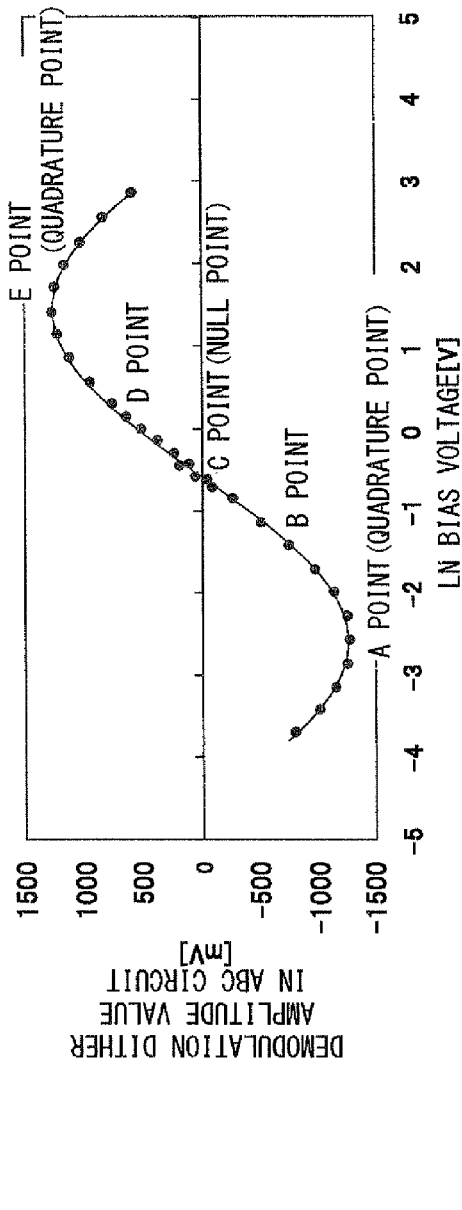
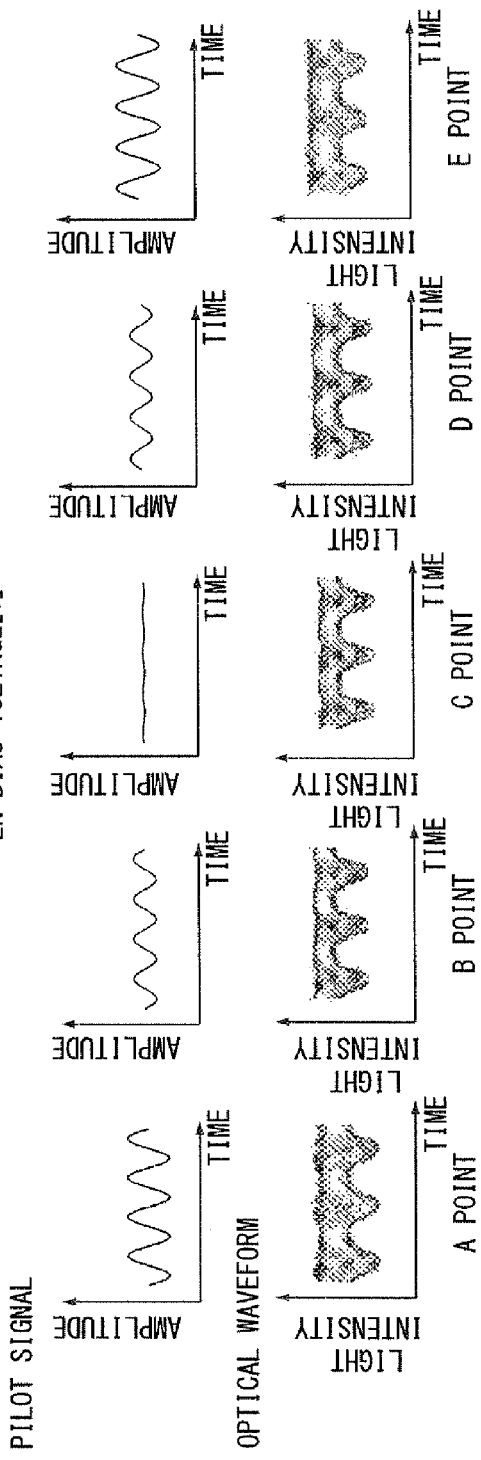
Fig. 6

INITIAL VOLTAGE AT WHICH CONTROL STABILITY TIME IS LONGEST
WHEN CONVENTIONAL METHOD IS USED

START VOLTAGE AT WHICH CONTROL STABILITY TIME IS LONGEST
WHEN METHOD OF THE PRESENT INVENTION IS USED

WHEN GAIN OF FEEDBACK SYSTEM IS LOW

WHEN GAIN OF FEEDBACK SYSTEM IS HIGH

OPTICAL TRANSMITTER AND BIAS VOLTAGE CONTROL METHOD

CROSS-REFERENCE TO RELATED PATENT APPLICATIONS

This application is a National Stage Entry of International Application No. PCT/JP2013/004929, filed Aug. 21, 2013, which claims priority from Japanese Patent Application No. 2012-187758, filed Aug. 28, 2012. The entire contents of the above-referenced applications are expressly incorporated herein by reference.

TECHNICAL FIELD

The present invention relates to an optical transmitter, and more particularly, to a bias voltage control for an optical transmitter.

BACKGROUND ART

In the recent optical communication systems, QPSK (Quadrature Phase Shift Keying) in which two-bit information is carried for each of four phase differences is used as a multilevel modulation method. Two parallel Mach-Zehnder (MZ) modulators (hereinafter referred to as "IQ modulators"), which are composed of two MZ modulators, are used in the QPSK. In the IQ modulators, the MZ modulators each serving as an MZ interferometer are connected in parallel, and a modulating signal of an in-phase channel (referred to as "I-channel" or "I-arm"), which is an in-phase component, and a modulating signal of a quadrature-phase channel (referred to as "Q-channel" or "Q-arm"), which is a quadrature component, are multiplexed by applying a carrier phase difference of 90 degrees.

An optical modulator of this type performs an intensity modulation on continuous light with a uniform intensity. Power for providing the intensity modulation includes signal power, which is proportional to an input digital signal (digital input signal), and DC bias power. To ensure that the digital signal operates properly, it is necessary to apply a bias (bias voltage or current) properly and to apply a signal (signal voltage or current) based on the bias. There are appropriate values for the signal power and bias power to obtain an optical modulating signal that is linear with respect to a digital input signal and has no distortion. However, since this MZ modulator is affected by the environmental temperature or temporal variation, an optimum bias voltage varies. Accordingly, in order to stabilize the signal quality, it is important to control the bias of the optical modulator with a high precision.

CITATION LIST

Patent Literature

[Patent Literature 11] Japanese Unexamined Patent Application Publication No. 2005-005767
[Patent Literature 2] Japanese Unexamined Patent Application Publication No. 2006-314003
[Patent Literature 3] Japanese Unexamined Patent Application Publication No. 2007-310288
[Patent Literature 4] Japanese Unexamined Patent Application Publication No. 2008-092172
[Patent Literature 5] Japanese Unexamined Patent Application Publication No. 2011-160257

SUMMARY OF INVENTION

Technical Problem

Heretofore, in order to optimally control a bias voltage of a modulator used in an optical transmitter at start-up of the transmitter, the control has been performed in such a manner that the bias voltage is gradually varied to find an optimum voltage. However, the use of this method poses a problem that if an initial start-up voltage is farthest from an optimum bias voltage lock point in the stable state of the modulator, a control stability time for obtaining the optimum voltage increases. Especially, in the case of a multilevel modulation method, such as coherent multilevel modulation, the control stability time inevitably increases in accordance with an increase in the number of MZIs (Mach-Zehnder interferometers) which require the bias control.

Accordingly, in the optical transmitter that performs a multilevel modulation, a reduction in the bias voltage control stability time of the modulator at start-up of the optical transmitter will become an important issue in the future. As the MSA (Multi-Source Agreement) defines the specifications and the like for optical transceivers, a reduction in the starting time of the optical transmitter is a feature different from that of conventional devices, and such a function is required.

Patent Literature 1 describes the basic principle of Auto Bias Control (ABC) operation during intensity modulation. However, Patent Literature 1 does not describe a time for convergence to a control point.

Patent Literature 2 describes the basic principle of the ABC operation during intensity modulation. Patent Literature 2 also describes the basic principle of the ABC operation during normal operation (after convergence to a control point). However, there is no description about a convergence time in Patent Literature 2. Further, Vπ characteristics of a modulator are scanned by an amount corresponding to one cycle, and maximum and minimum values are searched to obtain a control point. However, according to this method, a voltage of about 10 to 20 V is scanned at 2 Vπ during phase modulation, so that it takes too much time before the convergence of the ABC operation.

Patent Literature 3 describes the basic principle of the ABC operation during phase modulation. Also in Patent Literature 3, there is no description about the convergence time.

Patent Literature 4 describes a basic configuration example of the ABC operation during phase modulation. However, there is no description about the convergence time in Patent Literature 4.

Patent Literature 5 describes a technique to be used in direct modulation. Patent Literature 5 does not describe a convergence time. As described above, Patent Literature 1 to 5 do not provide any measures to reduce the bias voltage control stability time of the modulator at start-up of the optical transmitter.

The present invention has been made to solve the above-mentioned problems, and an object of the present invention is to provide an optical transmitter and a bias voltage control method which are capable of reducing a bias voltage control stability time of a modulator at start-up of the optical transmitter.

Solution to Problem

In an exemplary aspect, an optical transmitter includes: optical modulation means for modulating an optical signal to generate an optical modulating signal; bias voltage output means for supplying the optical modulation means with a bias voltage on which a pilot signal is superimposed; pilot signal receiving means for extracting a pilot signal component corresponding to the pilot signal by photoelectrically converting the optical modulating signal; and bias voltage control means. The bias voltage control means includes: training means for determining a control start voltage and a control direction of the bias voltage based on the pilot signal component at first and second bias voltage values; and feedback means for determining an appropriate bias voltage to compensate for a deviation of an operating point of the optical modulation means by analyzing the pilot signal component while adjusting the bias voltage in a stepwise fashion along the control direction from the control start voltage after the control start voltage and the control direction are determined. A first voltage step between the first and second bias voltage values is set to be larger than a second voltage step in the stepwise adjustment of the bias voltage in the feedback means.

In another exemplary aspect, a bias voltage control method for an optical transmitter includes: performing an optical modulation to generate an optical modulating signal by modulating an optical signal; outputting a bias voltage on which a pilot signal is superimposed, the bias voltage being supplied during the optical modulation; receiving a pilot signal to extract a pilot signal component corresponding to the pilot signal by photoelectrically converting the optical modulating signal; and performing a bias voltage control. The bias voltage control includes: a training process for determining a control start voltage and a control direction of the bias voltage based on the pilot signal component at first and second bias voltage values; and a feedback process for determining an appropriate bias voltage to compensate for a deviation of an operating point during the optical modulation by analyzing the pilot signal component while adjusting the bias voltage in a stepwise fashion along the control direction from the control start voltage after the control start voltage and the control direction are determined. A first voltage step between the first and second bias voltage values is larger than a second voltage step in the stepwise adjustment of the bias voltage in the feedback process.

Advantageous Effects of Invention

According to the above exemplary aspects, it is possible to provide an optical transmitter and a bias voltage control method which are capable of reducing a bias voltage control stability time of a modulator at start-up of the optical transmitter.

BRIEF DESCRIPTION OF DRAWINGS

FIG. 6 is a diagram showing results of evaluation of a change in pilot signal amplitude with respect to a bias voltage according to an embodiment of the invention;

DESCRIPTION OF EMBODIMENTS

First Exemplary Embodiment

Figure 1:
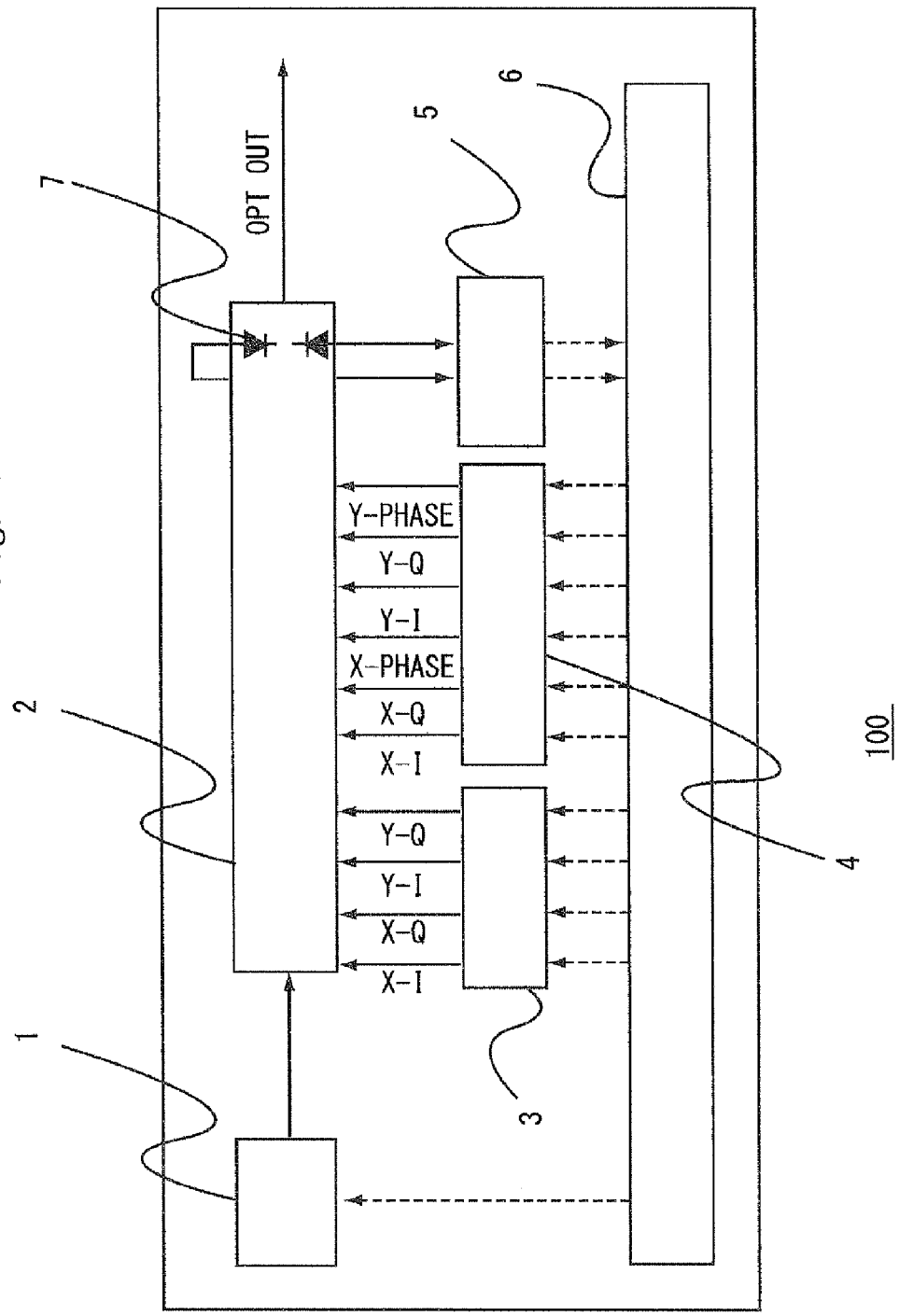
FIG. 1 is a configuration diagram showing an optical transmitter according to an exemplary embodiment of the invention.
Figure 10:
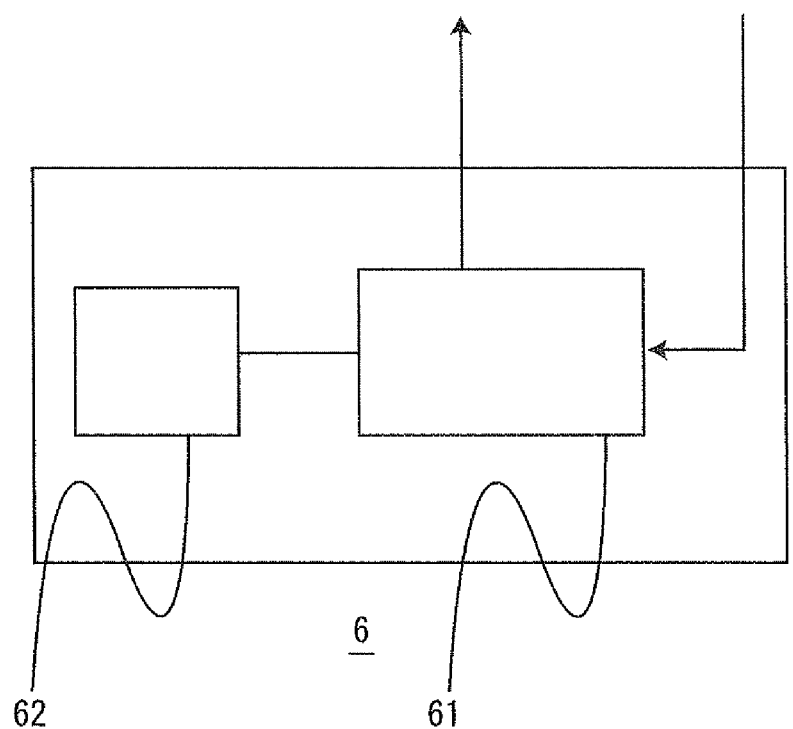
FIG. 10 is a configuration diagram showing a system according to an exemplary embodiment of the invention.

An exemplary embodiment of the present invention will be described below with reference to the drawings. Referring to FIG. 1, an optical transmitter 100 includes a light source 1, a QPSK (Quadrature Phase Shift Keying) modulator 2, a data driver 3, a bias output circuit 4, a pilot signal demodulating circuit 5, and a system 6. The system 6 includes a feedback unit 61 and a training unit 62 (FIG. 10).

Figure 2:
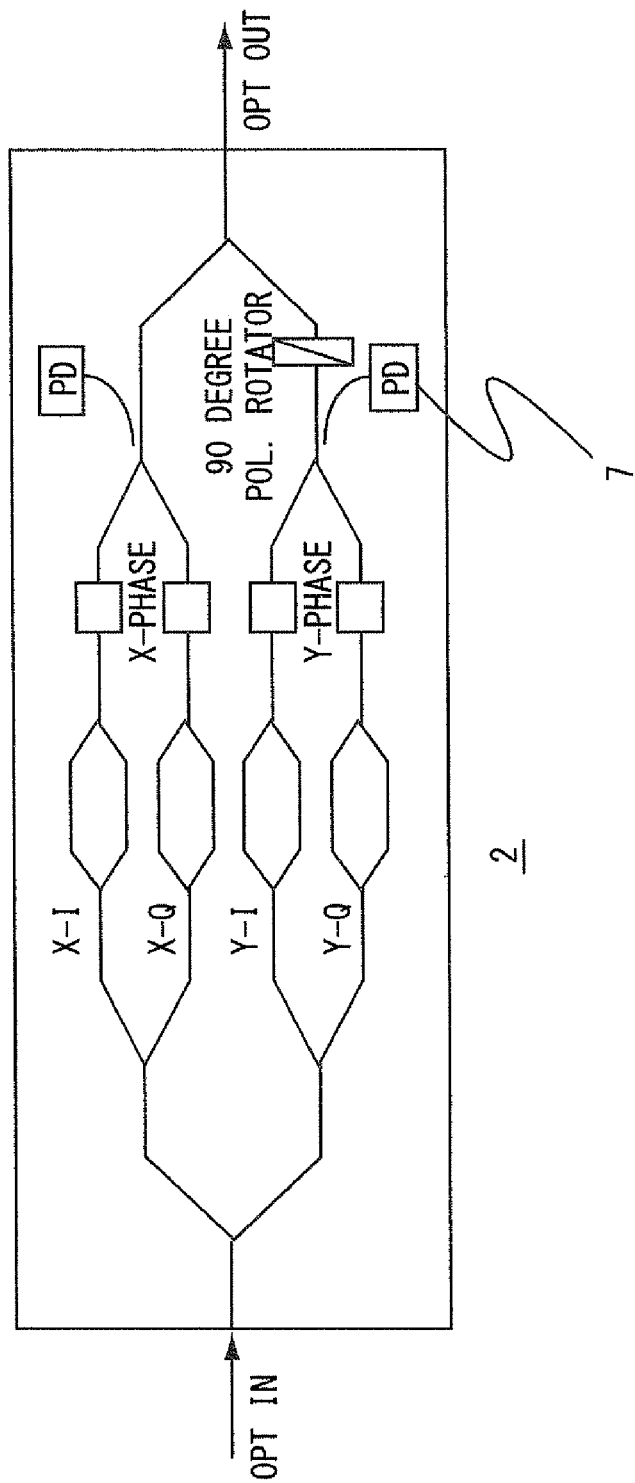
FIG. 2 is a configuration diagram showing a QPSK modulator according to an exemplary embodiment of the invention.

FIG. 2 is a diagram showing the inside of the modulator 2 in the optical transmitter shown in FIG. 1. An optical modulating signal is photoelectrically converted by a photodiode (PD) 7, which is disposed in the modulator, and a pilot signal component included in the optical modulating signal is monitored, thereby making it possible to observe the amount of deviation from an optimum bias voltage of the modulator.

Figure 3:
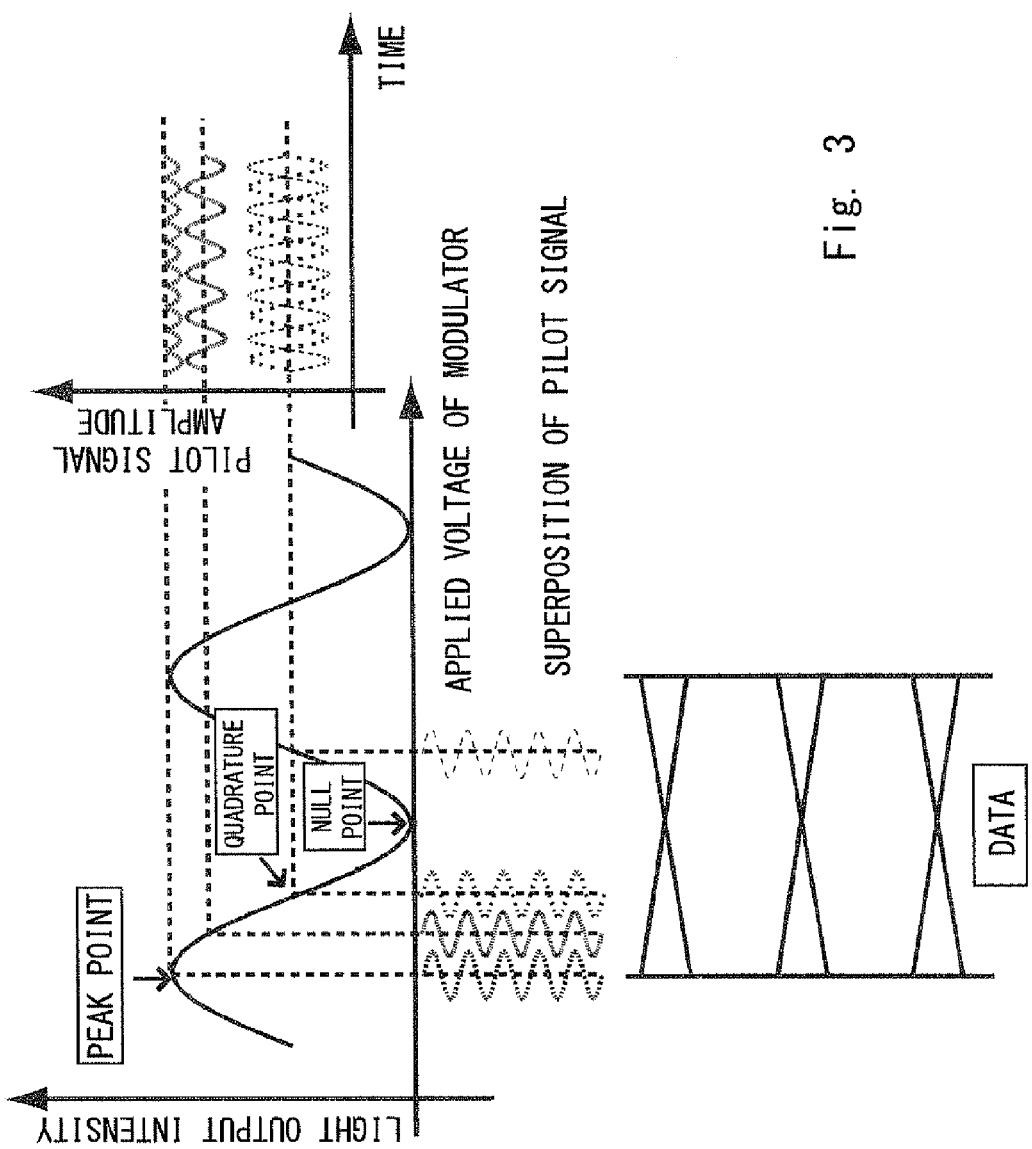
FIG. 3 is a diagram showing Vπ curve characteristics in I-arm and Q-arm of the QPSK modulator according to an exemplary embodiment of the invention.

FIG. 3 shows Vπ curve characteristics in I-arm and Q-arm of the QPSK modulator. The vertical axis represents a light output intensity, and the horizontal axis represents an applied voltage (bias voltage) of the modulator. The light output intensity changes in accordance with a change in the applied voltage. In order to control the bias voltage of the modulator, low-frequency pilot signals are respectively superimposed on the bias voltage for the I-arm and the bias voltage for the Q-arm (bias output circuit 4), and the demodulated pilot signal is extracted from the PD 7 of the modulator (pilot signal demodulating circuit 5). Further, the pilot signal is transmitted to the system 6, and is fed back to the bias output circuit 4 by the feedback unit 61.

This method is generally called an ABC control (Auto Bias Control). The amplitude of the demodulated pilot signal varies depending on the bias voltage applied when the pilot signal is superimposed. This state is shown in FIG. 3. When the bias voltage is adjusted so that the light output intensity is maximized (PEAK point), the amplitude of the pilot signal is minimum.

When the bias voltage is adjusted so that the light output intensity is reduced to a half from a maximum point (QUADRATURE point), the amplitude of the pilot signal is maximum. Also when the bias voltage is adjusted to a NULL point where the light output intensity is minimum, the amplitude of the pilot signal is minimum. The phases of the pilot signal in the slopes of the Vπ curve symmetrical with respect to the NULL point are inverted by 180 degrees. Accordingly, the bias voltage and the amplitude and phase of the pilot signal change relative to the Vπ curve. Monitoring a change in the pilot signal enables feedback control for locking the bias voltage at the NULL point.

The procedure for setting the bias voltage in this exemplary embodiment includes a training process 80 and a feedback control 81 subsequent to the training process 80. In the training process 80, a control start voltage (start voltage) of the bias voltage starting from the bias voltage at start-up and a control direction are determined. The term "control start voltage" of the bias voltage refers to an initial bias voltage value for starting the normal feedback control 81 to compensate for a deviation of an operating point of the modulator 2. The term "control direction" of the bias voltage refers to a direction in which the bias voltage is changed when the normal feedback control 81 is started (i.e., in such a direction as to increase or decrease the bias voltage). In the feedback control 81, pilot signals are compared, while the bias voltage is sequentially changed from the control start voltage, which is determined in the training process, along the control direction, and the pilot signals are controlled in such a manner that the amplitude of each pilot signal is minimized (NULL point=bias optimum point).

The amplitude of each pilot signal, which becomes 0 at two points, i.e., the NULL point and the PEAK point (FIG. 4C), is controlled so as to converge to the NULL point corresponding to the bias optimum point.

First, the steps of the training process 80 performed by the training unit 62 will be described. In order to determine the state of the initial bias voltage in the Vπ curve, the amplitude and phase of the pilot signal at a bias voltage value at start-up (a first point) and the amplitude and phase of the pilot signal at a second bias voltage value, which is different from the first bias voltage value, are monitored and compared. As shown in FIGS. 5A to 5D, based on the amplitude and phase of the pilot signal at the first bias voltage and the amplitude and phase of the pilot signal at the second bias voltage, the following four patterns can be considered as the state of the bias voltage at start-up of the optical transmitter.

(a) phase=negative; Vπ/2 or more away from the bias optimum point (NULL point) (FIG. 5A)
(b) phase=negative; Vπ/2 or less away from the bias optimum point (NULL point) (FIG. 5B)
(c) phase=positive; Vπ/2 or less away from the bias optimum point (NULL point) (FIG. 5C)
(d) phase=positive; Vπ/2 or more away from the bias optimum point (NULL point) (FIG. 5D)

Figure 4A:
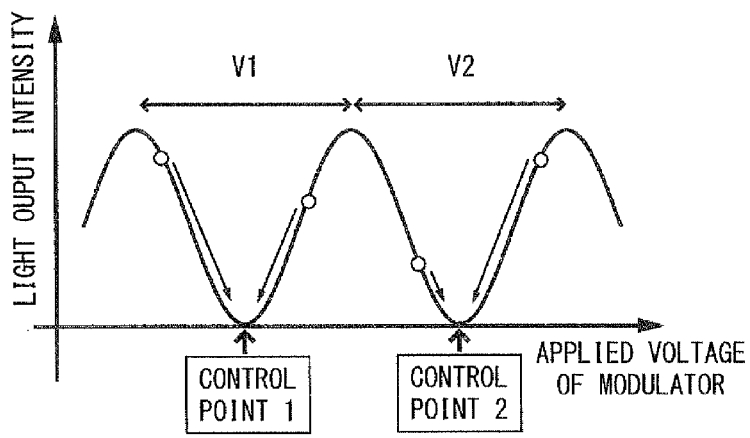
FIG. 4A is an explanatory diagram showing a bias voltage control according to an exemplary embodiment of the invention.

Next, the determination of the control direction will be described. The pilot signal demodulating circuit 5 first monitors the positive or negative phase at the first point, thereby determining whether the initial voltage lies on the upslope or downslope of the Vπ curve with respect to the NULL point. The feedback unit 61 controls the voltage via the bias output circuit 4 in such a manner that when the initial voltage lies on the downslope of the Vπ curve, the voltage is controlled in such a direction as to increase the voltage, while when the initial voltage lies on the upslope of the Vπ curve, the voltage is controlled in such a direction as to decrease the voltage (FIG. 4A). In other words, in the initial state, when the phase of the initial voltage is negative (when the amplitude of the pilot signal is negative), the applied voltage (bias voltage) of the modulator is controlled in such a direction as to increase the voltage. When the phase of the initial voltage is positive (when the amplitude of the pilot signal is positive), the applied voltage (bias voltage) of the modulator is controlled in such a direction as to decrease the voltage.

Referring next to the flowcharts of FIG. 9A to 9D, the determination of the control start voltage in the training process will be described in further detail. In the case of the above-mentioned pattern (a) or (d), the amplitude of the pilot signal temporarily increases and reaches the maximum point in accordance with an increase (decrease) in the applied voltage (bias voltage) of the modulator, and then decreases to the minimum point of the amplitude which corresponds to the bias optimum point (NULL point). Accordingly, the amplitude of the pilot signal at the initial (first) bias voltage is compared with the amplitude of the pilot signal at the second bias voltage. When the amplitude of the pilot signal at the second bias voltage is greater than that at the first bias voltage, the voltage is increased or decreased in a stepwise fashion as described below. Further, a bias voltage value at which the pilot signal amplitude has a maximum value or a value in the vicinity of the maximum value is determined, and the control start voltage is determined based on the bias voltage value. For example, a bias voltage value at which the pilot signal amplitude has a maximum value or a value in the vicinity of the maximum value may be used for the control start voltage. Alternatively, an interpolated value between a bias voltage value, at which the pilot signal amplitude has a maximum value or a value in the vicinity of the maximum value, and a value preceding the bias voltage value may be used for the control start voltage.

Figure 5A:
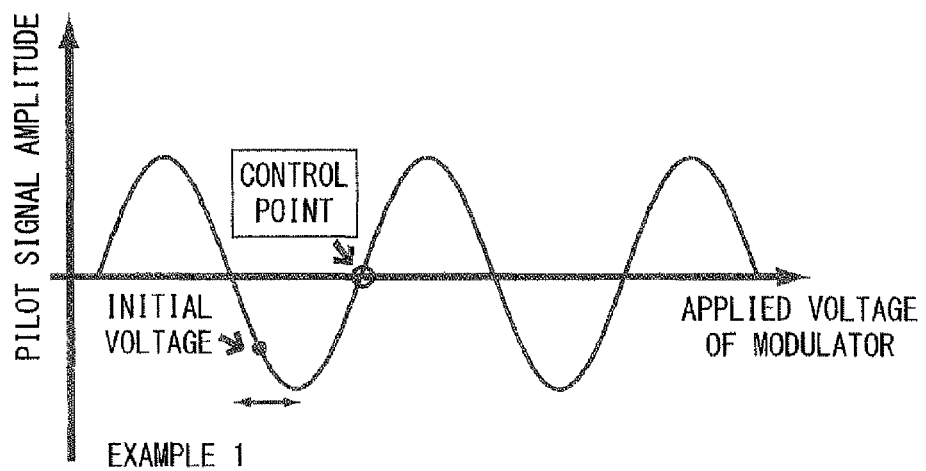
FIG. 5A is a pattern diagram showing a case where the amplitude value, phase, and voltage of a pilot signal are varied according to an exemplary embodiment of the invention.
Figure 5B:
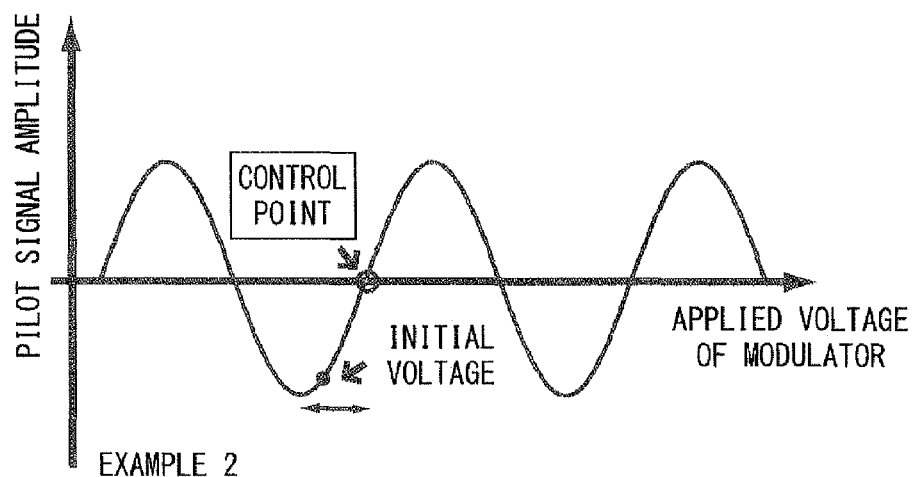
FIG. 5B is a pattern diagram showing a case where the amplitude value, phase, and voltage of the pilot signal are varied according to an exemplary embodiment of the invention.

As shown in FIGS. 5A(a) and 5D(d), when an initial voltage (A[V]) 201 is set at a point which is Vπ/2 or more away from a control point (Y: integer, Y=1 at this point), the amplitude value (B[V]) and the positive or negative phase of the pilot signal are stored (step 202). After the determination as to the positive or negative phase (step 203), in steps 204a and 204b, the bias voltage is increased (A+ΔV) or decreased (A−ΔV) by a variable width of ΔV (Y=2 at this point). In this case, a change step (change width) of the bias voltage in the training process is, for example, ΔV=Vπ/8.

In steps 206a and 206b, the amplitude value C[V] and the positive or negative phase of the pilot signal at this point are stored. In steps 207a and 207b, it is determined whether the amplitude value of the pilot signal satisfies B>C. In the case of the patterns (a) and (d), B>C is not satisfied. Accordingly, in steps 208a and 208b, the bias voltage is further increased or decreased by ΔV, and A−2ΔV or A+2ΔV is set (Y=3 at this point). Then the amplitude value D[V] and the positive or negative phase of the pilot signal at this point are stored (steps 209a and 209b).

Next, it is determined whether the amplitude value of the pilot signal satisfies C>D (steps 210a and 210b). As a result, when C>D is not satisfied, the process is repeated Y times until the amplitude becomes maximum (steps 211a and 211b), and the process returns to steps 208a and 208b. As a result of the determination in steps 210a and 210b, when it is determined that C>D is satisfied, the start voltage is changed to A−(Y−1)×ΔV or A+(Y−1)×ΔV (steps 212a and 212b). In this case, the pilot signal amplitude has a maximum value or a value in the vicinity of the maximum value. Thus, the training process for the pattern (a) or (d) ends (step 230). Reference numeral 80 in FIG. 11 denotes the above-mentioned training process.

Figure 5C:
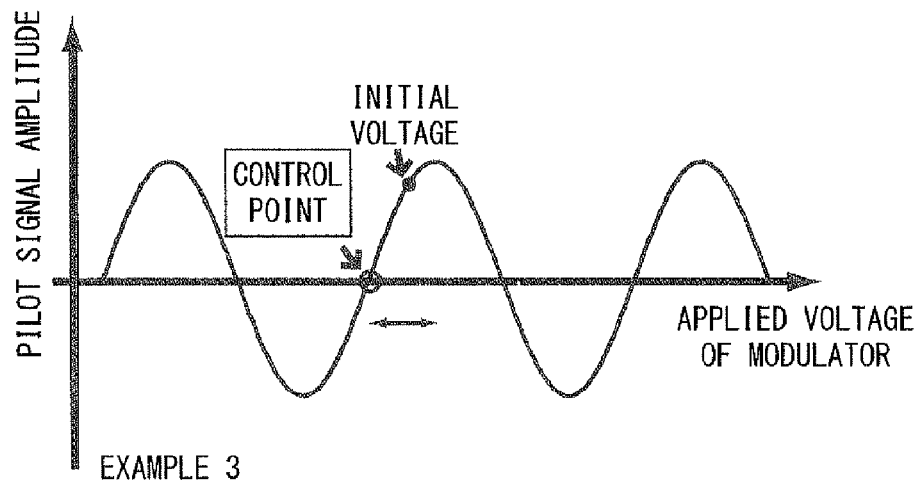
FIG. 5C is a pattern diagram showing a case where the amplitude value, phase, and voltage of the pilot signal are varied according to an exemplary embodiment of the invention.
Figure 5D:
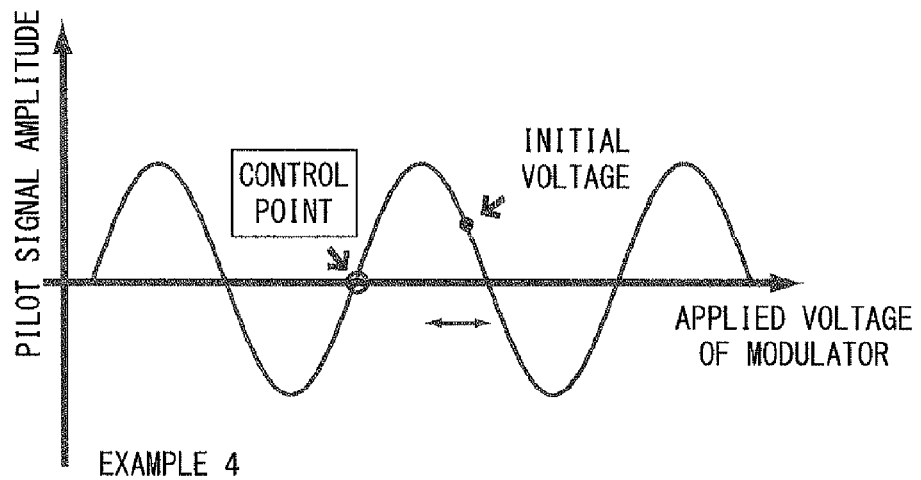
FIG. 5D is a pattern diagram showing a case where the amplitude value, phase, and voltage of the pilot signal are varied according to an exemplary embodiment of the invention.

Next, the case of the pattern (b) or (c) will be described. As shown in FIGS. 5C(c) and 5D(d), the amplitude of the pilot signal decreases in accordance with an increase (decrease) in the applied voltage (bias voltage) of the modulator. Accordingly, the amplitude of the pilot signal at the initial point is compared with the amplitude of the pilot signal at the second point which is subsequent to the initial point (steps 207a and 207b). When the amplitude of the pilot signal at the second point is smaller than that at the initial point, the control start voltage is determined based on the bias voltage value at the second point (steps 220a and 220b). For example, the bias voltage value at the second point may be used for the control start voltage. Alternatively, an interpolated value between the bias voltage value at the second point and the bias voltage value at the initial point may be used for the control start voltage. Thus, the training process for the pattern (b) or (c) ends.

An example in which the change step ΔV of the bias voltage in the training process is π/8 has been described above, but the value of the change step ΔV is by way of example only. In other words, any value can be used as the change step ΔV of the bias voltage in the training process, as long as the value is greater than the change step of the bias voltage in the feedback control to be subsequently performed. However, if the change step (change width) of the bias voltage in the training process is extremely large, the value exceeds the control point to a large extent in the patterns (b) and (c). If there is a temperature drift in the modulator due to a rapid temperature change at start-up, it is not desirable to set an extremely large variable width. On the other hand, if the variable width is small, it takes a long time to perform the training process for finding the control start voltage (start voltage) in the patterns (a) and (d).

Figure 4B:
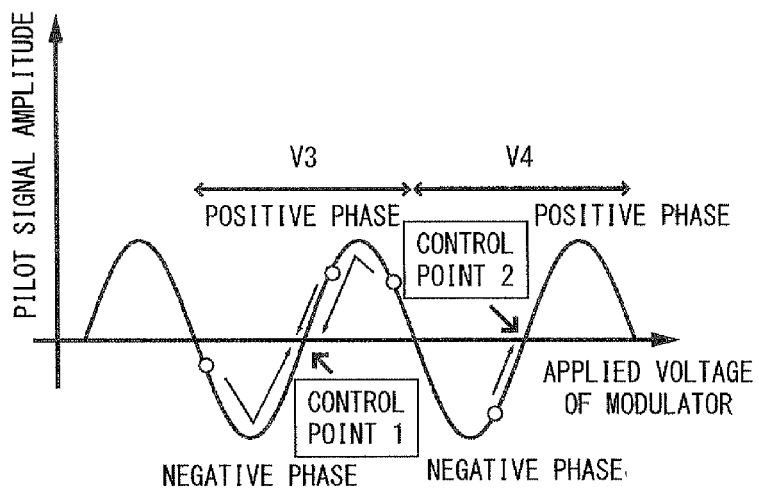
FIG. 4B is an explanatory diagram showing the bias voltage control according to an exemplary embodiment of the invention.

FIG. 4A shows the Vπ curve of the modulator. FIG. 4B shows a state of change in the pilot signal amplitude with respect to the bias voltage. A method for locking the bias voltage at the NULL point at start-up of the optical transmitter will be described. As shown in FIG. 4A, the Vπ curve and the bias voltage are compared. When the initial voltage falls within a slope range V1 at start-up of the optical transmitter, the system 6 performs the bias control for locking the bias voltage at a control point 1.

As shown in FIG. 4B, changes in the pilot signal amplitude with respect to the bias voltage are compared. When the initial voltage falls within a slope range V4 at start-up of the optical transmitter, the system 6 performs the bias control for locking the bias voltage at a control point 2.

Figure 4C:
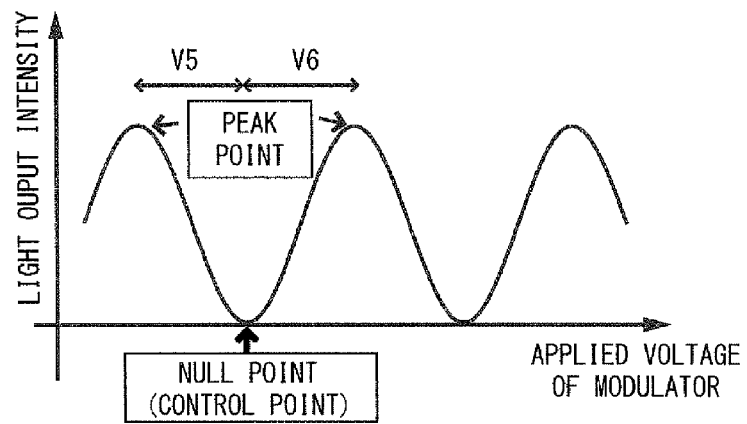
FIG. 4C an explanatory diagram showing the bias voltage control according to an exemplary embodiment of the invention.

As shown in FIG. 4C, assuming that the phase of the pilot signal within a slope range V5 is negative, the phase of the pilot signal within a slope range V6 is positive. The feedback control is performed such that the bias voltage is increased when the phase of the pilot signal is negative, and the bias voltage is decreased when the phase of the pilot signal is positive, thereby making it possible to control the bias voltage toward the NULL point. Thus, the bias voltage is not locked at the PEAK point.

FIG. 6 shows results of evaluation of a change in the pilot signal amplitude with respect to the bias voltage. It can be seen from FIG. 6 that the amplitude of the pilot signal is minimized at the NULL point and the phase of the pilot signal is inverted by 180 degrees at the NULL point. The optical waveform is shown in the lower part of FIG. 6. Each graph shows an eye pattern of the optical waveform in the phase modulation. Assuming that the NULL point is an optimum state, a deviation of the bias voltage indicates a deterioration in the shape of the waveform. The steps described above are the training process steps.

Figure 11:
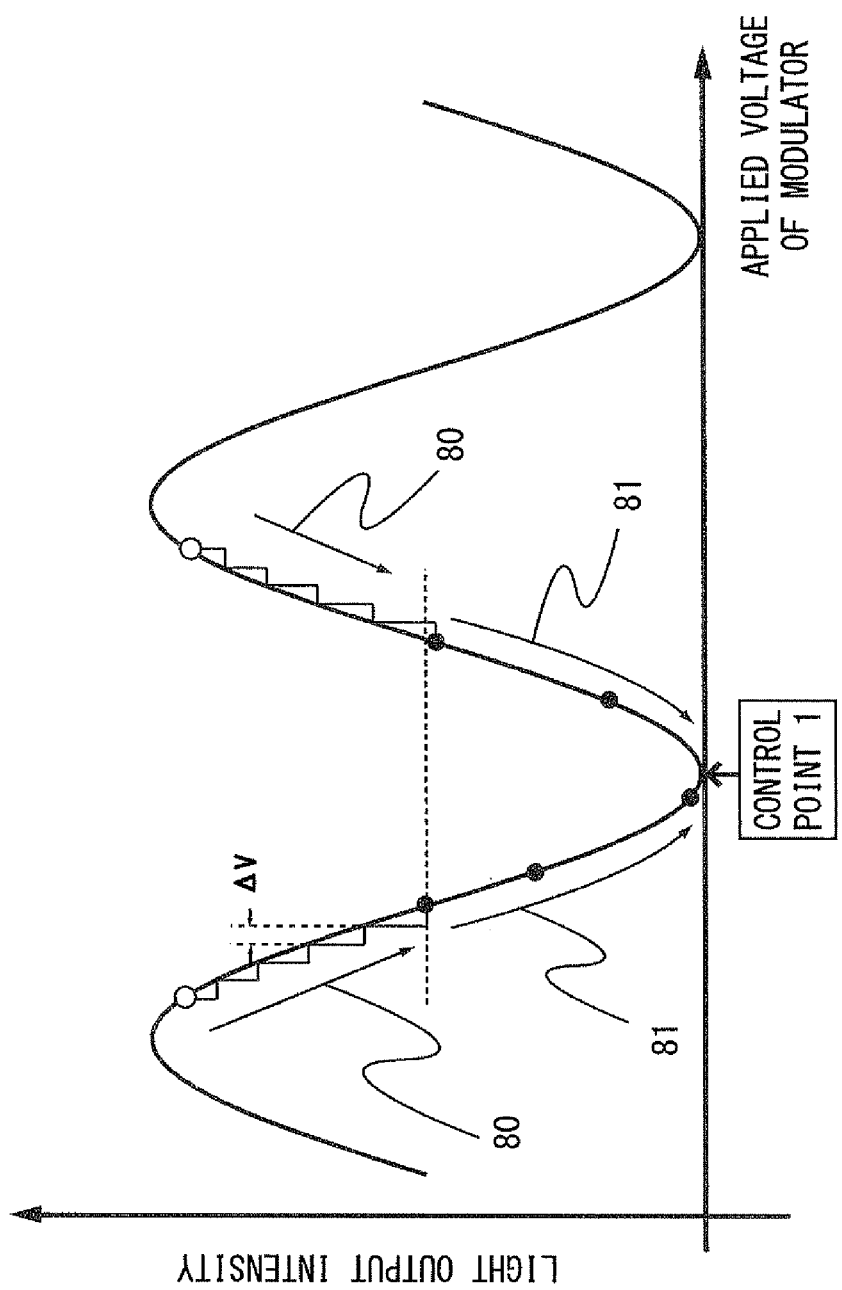
FIG. 11 is a graph showing a training process and a bias voltage control according to an exemplary embodiment of the invention.
Figure 12:
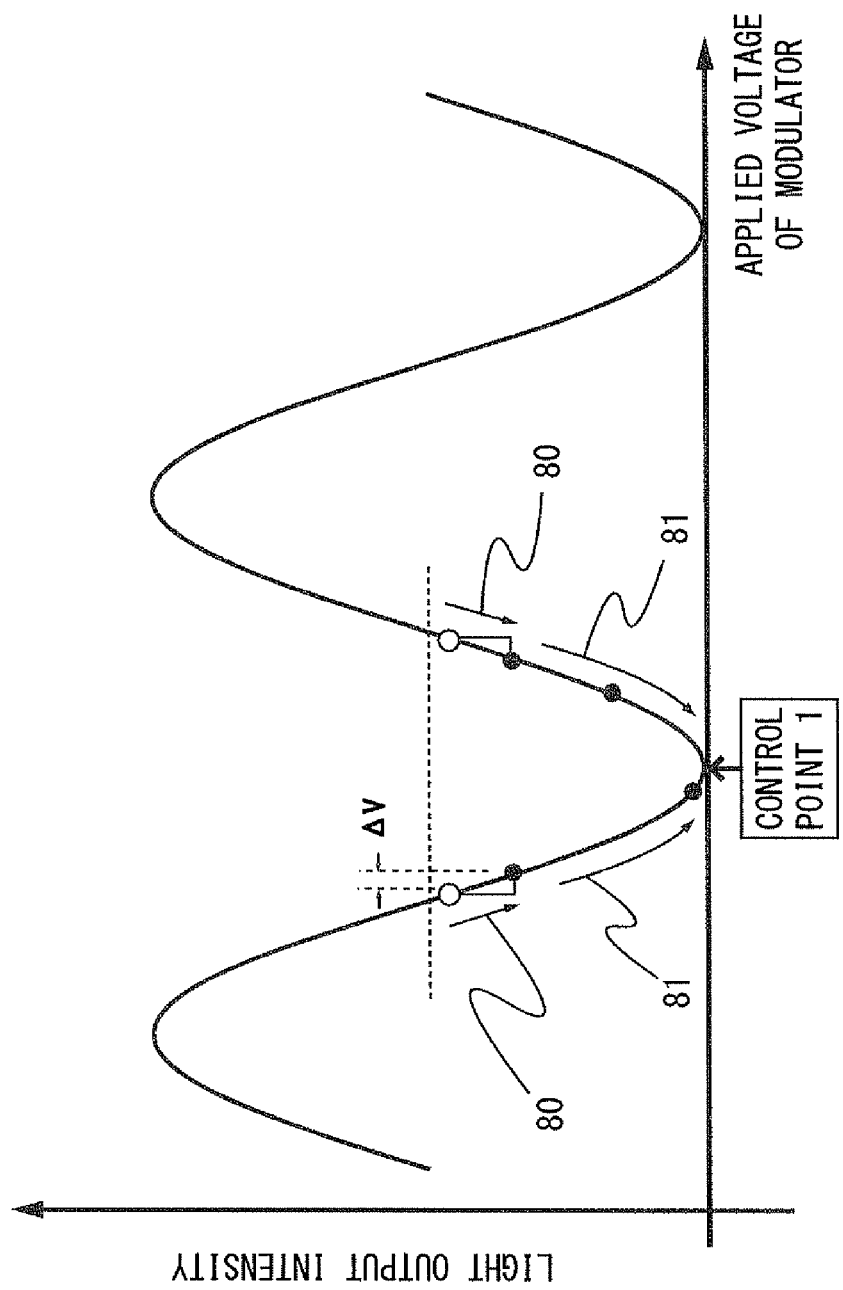
FIG. 12 is a graph showing the training process and the bias voltage control according to an exemplary embodiment of the invention.

Next, the feedback control step 81 subsequent to the training process, that is, the step of controlling the bias voltage toward the bias optimum point, will be described (FIGS. 11 and 12). After the control start voltage and the control direction are determined in the above-mentioned training process 80, the amplitudes of pilot signals are sequentially compared, while the applied voltage (bias voltage) of the modulator is increased (in the case of the pattern (a) or (d)) or decreased (in the case of the pattern (b) or (c)) from the control start voltage along the control direction as in the common practice, to thereby detect the NULL point.

The NULL point and the PEAK point can be discriminated from each other based on phase information and amplitude information. However, if the control is performed without any regard to the initial state as in the conventional techniques, it is necessary to scan a half-wavelength of the Vπ curve at a maximum depending on the initial state. Accordingly, it takes a long time for convergence to take place.

Figure 7A:
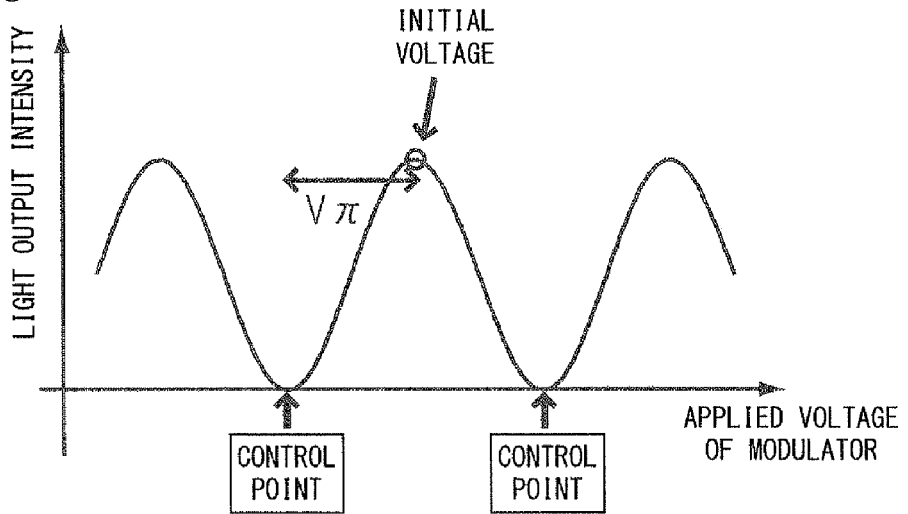
FIG. 7A is a comparison diagram showing a control stability time according to an exemplary embodiment of the invention.
Figure 7B:
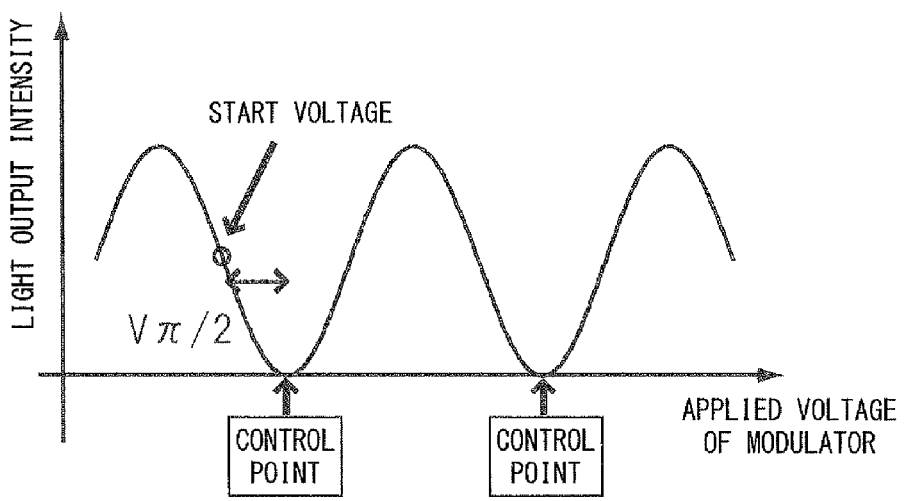
FIG. 7B is a comparison diagram showing a control stability time according to an exemplary embodiment of the invention.
Figure 8A:
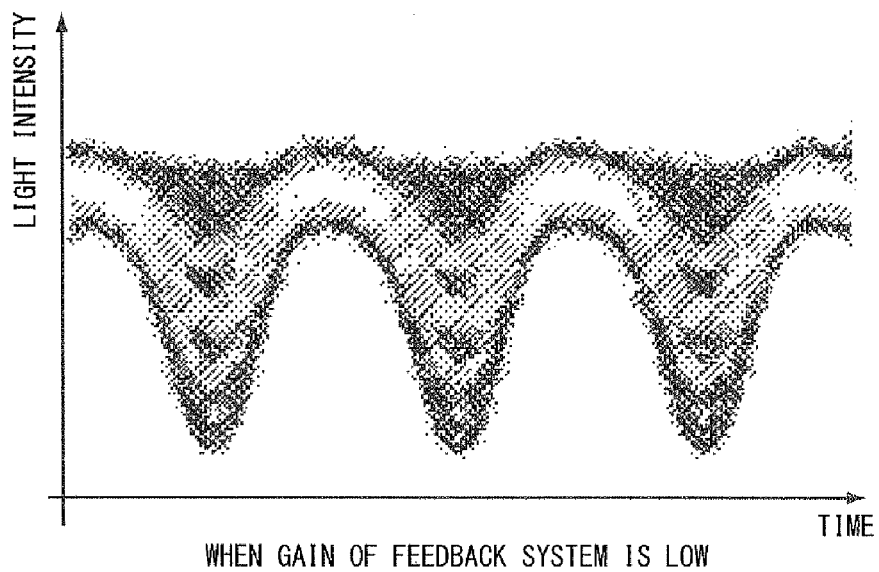
FIG. 8A is a diagram showing an effect of the intensity of a gain of a feedback system on an optical waveform according to an exemplary embodiment of the invention.
Figure 8B:
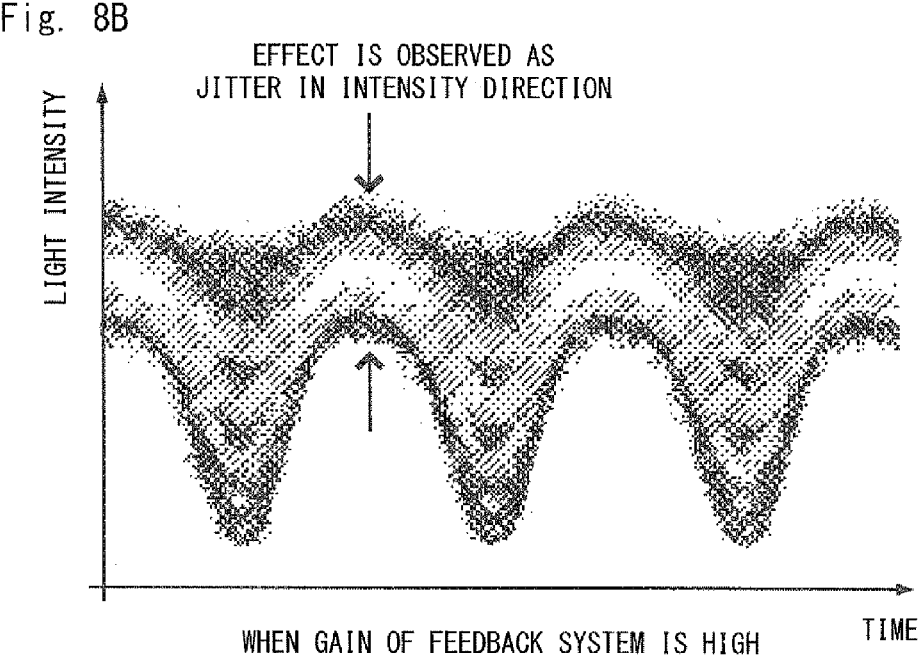
FIG. 8B is a diagram showing an effect of the intensity of the gain of the feedback system on the optical waveform according to an exemplary embodiment of the invention.
Figure 9A:
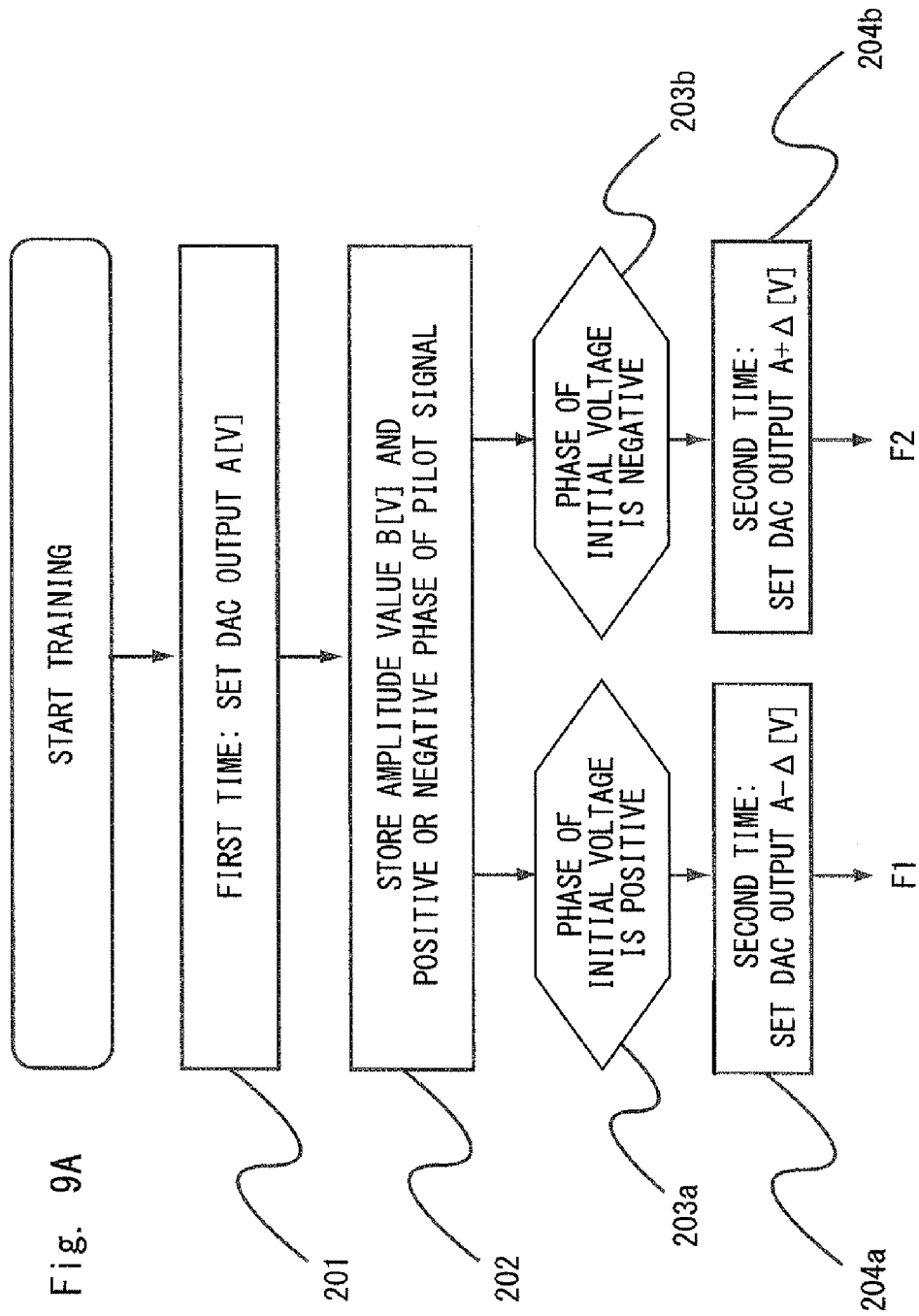
FIG. 9A is a flowchart showing a bias voltage control according to an exemplary embodiment of the invention.
Figure 9B:
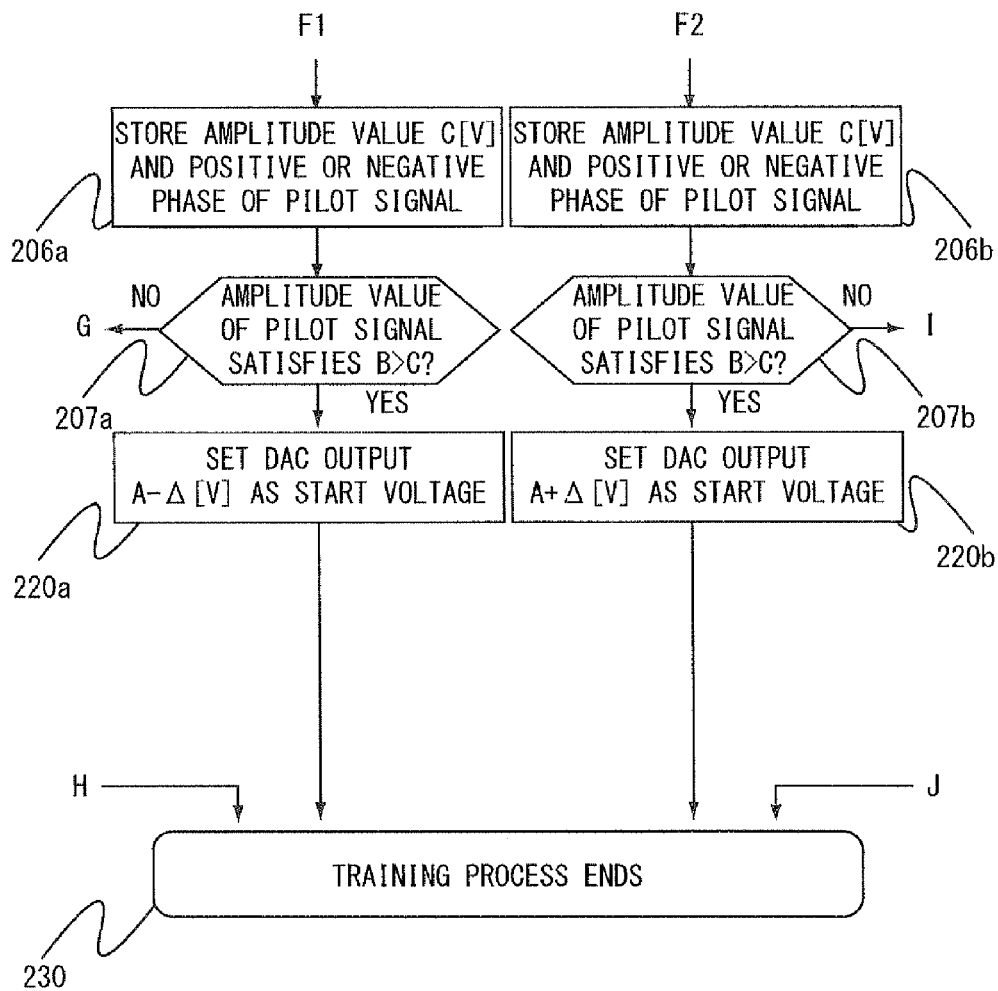
FIG. 9B is a flowchart showing the bias voltage control according to an exemplary embodiment of the invention.
Figure 9C:
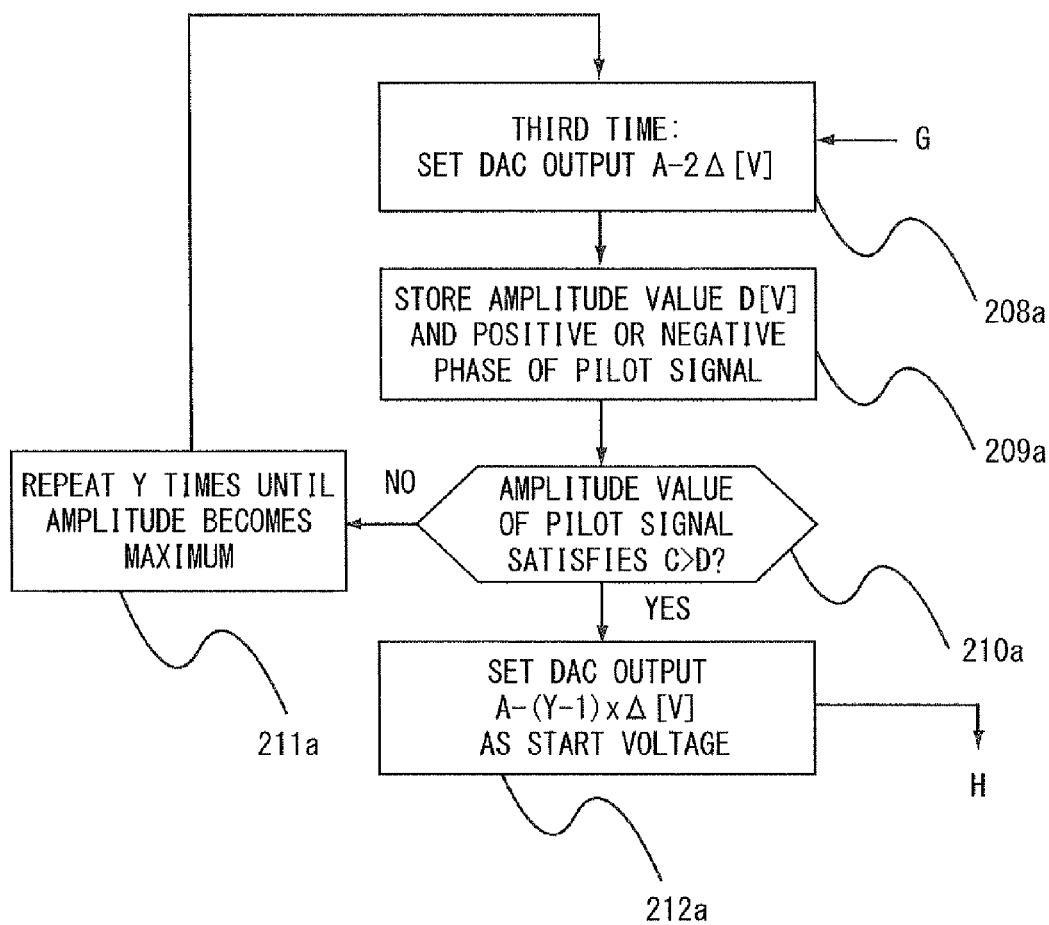
FIG. 9C is a flowchart showing the bias voltage control according to an exemplary embodiment of the invention.
Figure 9D:
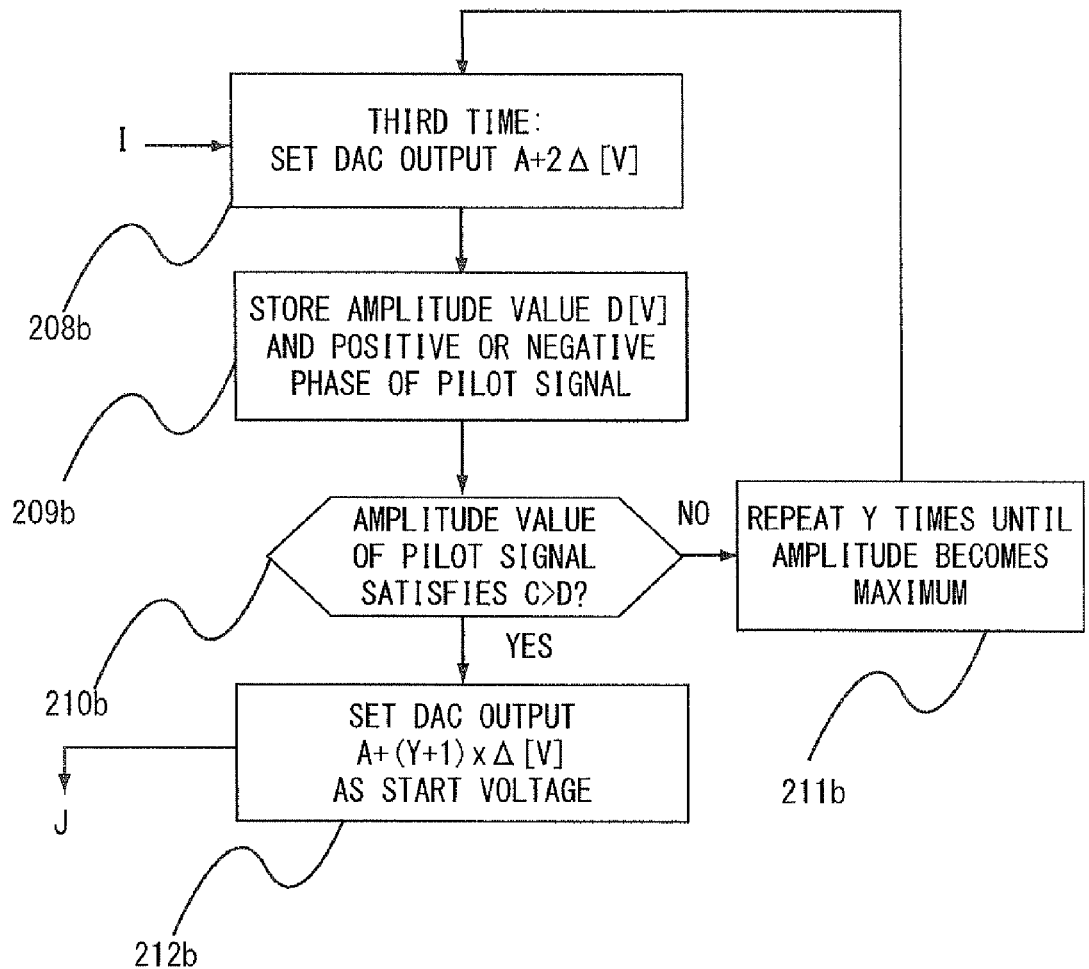
FIG. 9D is a flowchart showing the bias voltage control according to an exemplary embodiment of the invention.

As described above, according to the bias voltage control method according to this exemplary embodiment, the starting time of the optical transmitter can be reduced. As shown in FIGS. 7A and 7B, the control stability time can be reduced to about ½ at a maximum. When the total gain of a feedback system is increased, the control stability time can be reduced. However, the stability of the feedback system increases as the gain decreases. This is because when the gain is high, an effect on the optical waveform is observed as jitter (fluctuations in temporal position of the phase of an electric signal) in the eye pattern of the optical waveform in the phase modulation as shown in FIGS. 8A and 8B, which leads to a deterioration of quality. On the other hand, when the effect of jitter is small, it is also possible to increase the gain to perform the bias voltage control in the manner as described above.

As described above, in this exemplary embodiment, the training process is carried out at start-up of the optical transmitter to determine the bias voltage value (control start voltage) close to the NULL point (control point) and start the bias control from the voltage, thereby making it possible to reduce the control stability time. Since the normal bias control places an emphasis on the stability of the feedback system, it takes a long time to ensure the control stability. According to the control method of this exemplary embodiment, it is possible to reduce the control stability time while maintaining the stability of the feedback system. More alternatively, the control according to the control method of this exemplary embodiment may be performed only at start-up (including restart) of the optical transmitter, and the normal feedback control may be performed during operation. This prevents the ABC control from being complicated.

The bias voltage control method for compensating for a deviation of the operating point as described in this exemplary embodiment may be implemented by using a semiconductor processing device including an ASIC (Application Specific Integrated Circuit). This method can also be implemented by causing a computer system including at least one processor (e.g., a microprocessor, an MPU, or a DSP (Digital Signal Processor)) to execute a program. Specifically, one or more programs including an instruction set for causing the computer system to execute an algorithm for the bias voltage control described above with reference to flowcharts and the like may be prepared and supplied to the computer.

These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (programmable ROM), EPROM (erasable PROM), flash ROM, RAM (random access memory), etc.). The programs may be provided to a computer using any type of transitory computer readable media. Examples of transitory computer readable media include electric signals, optical signals, and electromagnetic waves. Transitory computer readable media can provide the programs to a computer via a wired communication line, such as electric wires and optical fibers, or a wireless communication line.

The present invention is not limited to the above exemplary embodiments, and can be modified as appropriate without departing from the scope of the invention. For example, the amount of change ΔV of the voltage in the training process described above may be changed as needed, instead of setting the amount of change constant. The device and method for use in the bias voltage control described in the first exemplary embodiment can also be applied to optical modulators for BPSK (binary phase shift keying), 8-PSK (8 phase shift keying), OQPSK (offset QPSK), n/4-shift QPSK, PLL-QPSK, n/2-shift BPSK, 16-QAM, 64-QAM, and the like.

While the present invention has been described above with reference to exemplary embodiments, the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2012-187758, filed on Aug. 28, 2012, the disclosure of which is incorporated herein in its entirety by reference.

REFERENCE SIGNS LIST

1 LIGHT SOURCE
2 QPSK MODULATOR
3 DATA DRIVER
4 BIAS OUTPUT CIRCUIT
5 PILOT SIGNAL DEMODULATING CIRCUIT
6 SYSTEM
7 PHOTODIODE
61 FEEDBACK UNIT
62 TRAINING UNIT
80 TRAINING PROCESS
81 BIAS VOLTAGE CONTROL
100 OPTICAL TRANSMITTER
201 FIRST DAC OUTPUT SETTING
202 STORE AMPLITUDE VALUE AND POSITIVE OR NEGATIVE PHASE OF PILOT SIGNAL
203 DETERMINE POSITIVE OR NEGATIVE PHASE OF INITIAL VOLTAGE
204 SECOND DAC OUTPUT SETTING
206 STORE AMPLITUDE VALUE AND POSITIVE OR NEGATIVE PHASE OF PILOT SIGNAL
207 COMPARE AMPLITUDE VALUES OF PILOT SIGNALS
208 THIRD DAC OUTPUT SETTING
209 STORE AMPLITUDE VALUE AND POSITIVE OR NEGATIVE PHASE OF PILOT SIGNAL
210 COMPRE AMPLITUDE VALUES OF PILOT SIGNALS
211 REPEAT PROCESS Y TIMES UNTIL AMPLITUDE BECOMES MAXIMUM
212 SET VOLTAGE AS START VOLTAGE
230 TRAINING PROCESS ENDS

The invention claimed is:

1. An optical transmitter comprising:
   optical modulation unit that modulates an optical signal to generate an optical modulating signal;
   bias voltage output unit that supplies the optical modulation unit with a bias voltage on which a pilot signal is superimposed;
   pilot signal receiving unit that extracts a pilot signal component corresponding to the pilot signal by photoelectrically converting the optical modulating signal; and
   bias voltage control unit,
   wherein the bias voltage control unit includes:
   training unit that determines a control start voltage and a control direction of the bias voltage based on the pilot signal component at first and second bias voltage values; and
   feedback unit that determines an appropriate bias voltage to compensate for a deviation of an operating point of the optical modulation unit by analyzing the pilot signal component while adjusting the bias voltage in a stepwise fashion along the control direction from the control start voltage after the control start voltage and the control direction are determined,
   wherein the training unit determines the control start voltage based on a result of a comparison between a first amplitude value of the pilot signal component at the first bias voltage value and a second amplitude value of the pilot signal component at the second bias voltage value.

2. The optical transmitter according to claim 1, wherein the training unit sets, as the second bias voltage value, a voltage value smaller than a the first bias voltage value by a first voltage step, when a first phase of the pilot signal component at the first bias voltage value is positive, and the training unit sets, as the second bias voltage value, a voltage value greater than the first bias voltage value by the first voltage step, when the first phase is negative.

3. The optical transmitter according to claim 1, wherein
when the second amplitude value is greater than the first amplitude value, the training unit repeats an operation that adopts the second bias voltage value as a new first bias voltage value and uses a second bias voltage value based on the new first bias voltage value, and when an amplitude value of the pilot signal component at the new second bias voltage value is smaller than an amplitude value of the pilot signal component at the new first bias voltage value, the training unit determines the control start voltage based on the new second bias voltage value.

4. The optical transmitter according to claim 1, wherein
when the second amplitude value is smaller than the first amplitude value, the training unit determines the control start voltage based on the second bias voltage value.

5. A bias voltage control method for an optical transmitter, comprising:
performing an optical modulation to generate an optical modulating signal by modulating an optical signal;
outputting a bias voltage on which a pilot signal is superimposed, the bias voltage being supplied during the optical modulation;
receiving a pilot signal to extract a pilot signal component corresponding to the pilot signal by photoelectrically converting the optical modulating signal; and
performing a bias voltage control, wherein
the bias voltage control includes:
    a training process for determining a control start voltage and a control direction of the bias voltage based on the pilot signal component at first and second bias voltage values; and
    a feedback process for determining an appropriate bias voltage to compensate for a deviation of an operating point during the optical modulation by analyzing the pilot signal component while adjusting the bias voltage in a stepwise fashion along the control direction from the control start voltage after the control start voltage and the control direction are determined, wherein the training process includes determining the control start voltage based on a result of a comparison between a first amplitude value of the pilot signal component at the first bias voltage value and a second amplitude value of the pilot signal component at the second bias voltage value.

6. The bias voltage control method for an optical transmitter according to claim 5, wherein the training process includes:
setting, as the second bias voltage value, a voltage value smaller than the first bias voltage value by a first voltage step, when a first phase of the pilot signal component at the first bias voltage value is positive; and
setting, as the second bias voltage value, a voltage value greater than the first bias voltage value by the first voltage step, when the first phase is negative.

7. The bias voltage control method for an optical transmitter according to claim 5, wherein the training process includes:
repeating an operation that adopts the second bias voltage value as a new first bias voltage value and uses a second bias voltage value based on the new first bias voltage value, when the second amplitude value is greater than the first amplitude value; and
determining the control start voltage based on the new second bias voltage value, when an amplitude value of the pilot signal component at the new second bias voltage value is smaller than an amplitude value of the pilot signal component at the new first bias voltage value.

* * * * *

UNITED STATES PATENT AND TRADEMARK OFFICE
CERTIFICATE OF CORRECTION

PATENT NO. : 9,735,884 B2  
APPLICATION NO. : 14/422232  
DATED : August 15, 2017  
INVENTOR(S) : Goebuchi Page 1 of 1

It is certified that error appears in the above-identified patent and that said Letters Patent is hereby corrected as shown below:

In the Claims

Claim 2, Column 10, Line 64, "smaller than a the first bias voltage" should read -- smaller than the first bias voltage --.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*